INVENTOR
Paul Edward Koster
BY Knight Brothers
HIS ATTORNEYS

June 6, 1939.   P. E. KOSTER   2,160,970
INCLINOMETER FOR AIRCRAFT
Filed April 5, 1937   2 Sheets-Sheet 2
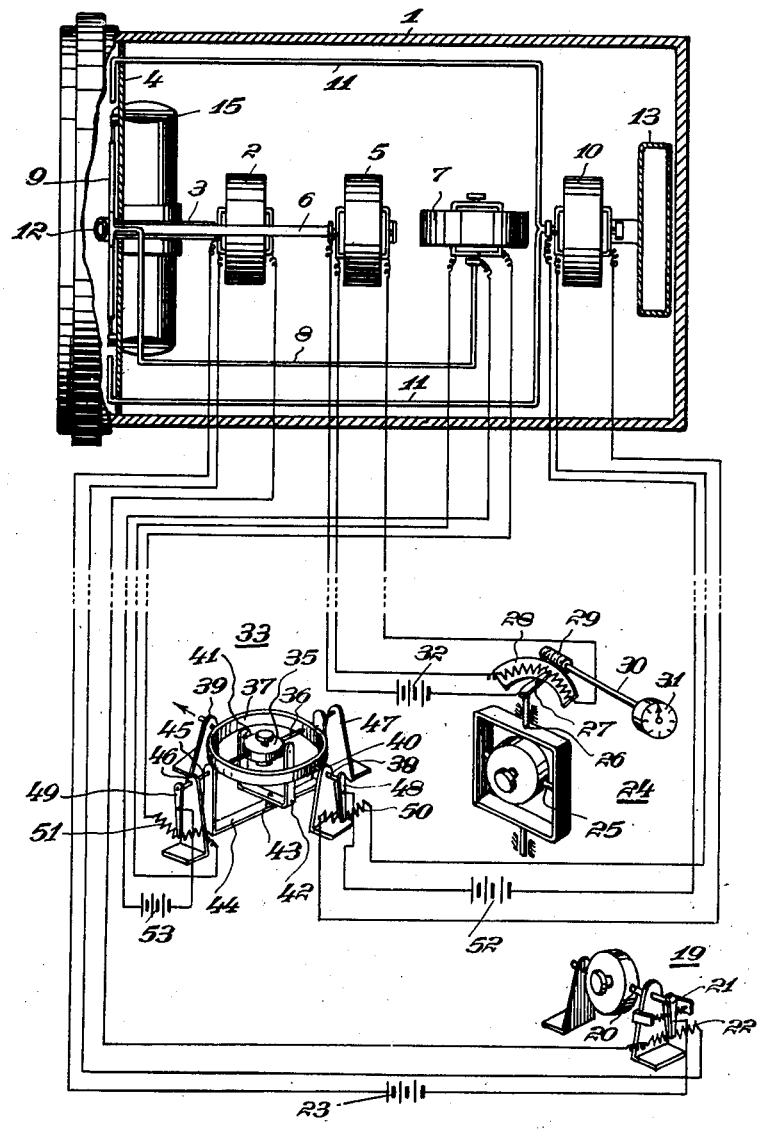
INVENTOR
Paul Eduard Koster
BY
Knight Brothers
HIS ATTORNEYS Patented June 6, 1939

2,160,970

UNITED STATES PATENT OFFICE 2,160,970

INCLINOMETER FOR AIRCRAFT

Paul Eduard Koster, Berlin-Siemensstadt, Germany, assignor to Siemens Apparate und Maschinen Gesellschaft mit beschrankter Haftung, Berlin, Germany, a corporation of Germany Application April 5, 1937, Serial No. 135,130
In Germany April 6, 1936

10 Claims.  (Cl. 33—204)

My invention relates to an inclinometer for aircraft as is particularly employed in airplanes for the control of the flight (blind flying). The ever increasing speed of flight of modern airplanes calls for a particularly high degree of reliability of such control instruments. This may be accomplished according to my invention by providing a flight control instrument in which the inclination of the airplane is indicated twice, i. e., by an artificial horizon and by a pendulum inclinometer of short period of oscillation.

It is well known in the art to employ either an artificial horizon or a pendulum inclinometer of short period of oscillation for indicating the inclination of the airplane. Both methods present advantages and disadvantages. It is true that exact indications are obtained by an artificial horizon, for instance, by a gyroscopic horizon, since it is insensitive to external forces, such as instantaneous accelerations. Owing, however, to the complicated construction of the artificial horizon and to the electric drive necessary therefor it may happen that the indication thereof is not correct if for instance, the power source should fail, whereas by the use of a pendulum inclinometer of short period of oscillation, for instance of a mechanical pendulum, liquid inclinometer or the like, a proper indication is always obtained when measuring for a comparatively long time, which indication may, however, be momentarily inaccurate, since it is influenced by accelerating forces. By combining, according to the invention, both methods for indicating the inclination of the airplane, a mutual control is obtained so that a reliable operation of the inclinometer is ensured at all times.

Further details of my invention will be apparent from the following description taken in connection with the accompanying drawings which show as an embodiment of my invention an arrangement in which various instruments necessary for the control of flight are combined to form a single unit. Such an arrangement brings about a saving in space in the pilot's cockpit and is accomplished partly owing to the improvements in gyroscopic instruments, such as, for instance, turn indicators, gyro course indicators, and artificial horizons combined with electrical control elements, which permit a remote indication of the magnitudes of the indications.

In the drawings, wherein like reference characters refer to like parts throughout the several views;

Fig. 3 is a top view thereof with the casing partly broken away shown in connection with the wiring diagram of the rotary magnets.

Figure 1:
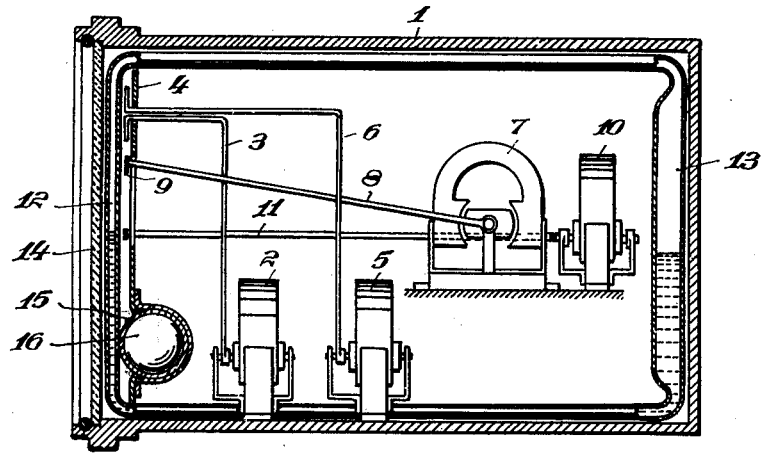
Fig. 1 is a longitudinal sectional view of the embodiment of my invention.

In the casing 1 in which the measuring mechanisms are arranged, 2 is a rotary magnet actuating pointer 3, which magnet is controlled by electrical forces proportional to the rate of turn of the craft. The pointer 3 is bent twice at right angles and moves with its free end over a circular scale 4. A counter-pointer 6 cooperating with the pointer 3 is actuated by the rotary magnet 5 and indicates the departures of the airplane from the predetermined course. The counter-pointer 6 is also provided with two bends at right angles so that its free end moves over the circular scale 4 and in the zero position lies above the free end of the pointer 3. Both pointers 3 and 6 rotate about the same axis.

A rotary magnet 7 transmits to a pointer 8 the movements of the airplane about the transverse axis imparted to said magnet by an electrical circuit controlled by a gyroscope as set out in detail later. The pointer 8 carries an airplane model 9 arranged at the free end thereof for movement over the circular scale 4. For the sake of simplicity, the pointer 8 is shown in Fig. 1 as indicating a climb of the craft. A rotary magnet 10 indicates the turns of the airplane about the longitudinal axis with the aid of a pointer 11 adjustably connected to the rotary magnet 10. The pointer 11 is bifurcated and bent in such a manner that both free ends thereof move over the circular scale 4 and lie, in the zero position, in the same axis with the airplane model.

A pitch indicator 12 filled with a suitable liquid, for instance, colored alcohol, surrounds the chamber for the reception of the inclinometer and is enlarged as indicated at 13. The measuring limb of the pitch indicator 12 extends through the space between the circular scale 4 and a common inspection window 14 and said limb is in registry with the pointers 3 and 6 in the zero position of the latter. The inspection window 14 closes the casing 1. 15 is a level for indicating the bank of the airplane in which a ball 16 may move. The level 15 is arranged transversely to the measuring limb of the pitch indicator 12 and more precisely directly behind the latter.

Figure 2:
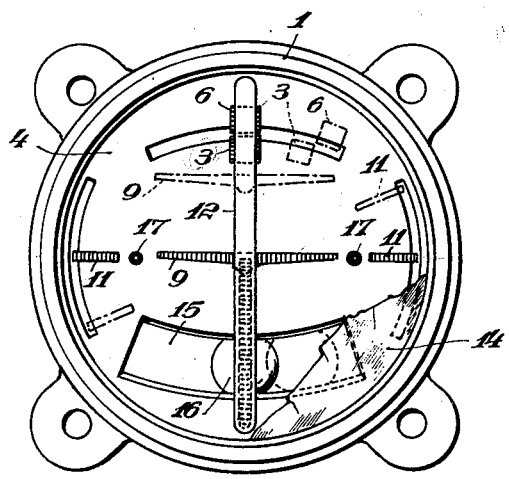
Fig. 2 is a front elevational view thereof.

Fig. 2 is a front elevational view of the embodiment shown in Fig. 1 and shows such an arrangement of the pointers and of the measuring instruments that all magnitudes may be read off within the same field of vision. In this view, the measuring limb of the pitch indicator 12 is perpendicular to the level 15 and is in registry with the pointers 3 and 6 in the zero position thereof. The pointer 11 and the free end 9 of the pointer 8 designed in the form of an airplane model lie in the zero position, in the same axis, which is perpendicular to the measuring limb of the pitch indicator 12, preferably in the center thereof. The marks 17 arranged on the circular scale 4 serve to indicate the zero position for the pointers 9 and 11. The limb of the pitch indicator 12 is preferably filled up to such an extent with liquid that the liquid level in the measuring limb coincides, in the zero position, with the horizontal axis of the airplane model 9. A position which the pointers assume when the airplane deviates from the normal position is shown in dot and dash lines.

The connections of the gyroscopic control devices and electrical circuits to the rotary magnets 2, 5, 7 and 10 are shown in Fig. 3. The rotary magnet 2 is controlled by a gyro rate of turn indicator 19 which measures, in a manner well known, the rate of turn of the airplane, by precession about the axis 20. A contact arm 21 firmly secured to the axis 20 and a stationary resistance 22 lie in bridge connection with the winding of the rotary magnet 2. A power source 23 supplies the necessary energy. By precession, the contact arm 21 slides over the resistance 22. In this manner, the bridge balance is disturbed and a differential current flows in the zero branch. This current causes a rotation of the winding of the rotary magnet 2 which is then transmitted to the pointer 3.

In the same manner, the rotary magnet 5 is controlled by a gyro course indicator 24. A deviation of the airplane from its normal course causes a relative rotation of the gyro casing with respect to the gyroscope which retains its direction. A contact arm 27 firmly secured to the normal axis 26 slides over a resistor 28, whereby are rotated the winding of the rotary magnet 5 and pointer 6, said winding lying in bridge connection with the contact arm 27 and the resistor 28. The resistance 28 may be adjusted in accordance with a device 31 for adjusting a certain course through a worm 29 and a shaft 30. 32 is a power source which supplies the bridge system with energy.

The control of the two rotary magnets 7 and 10 is effected by an artificial horizon 33. The latter consists of a gyroscopic system 35 in Cardanic suspension which is continuously held in the horizon by particular devices. The gyroscope 35 is pivotally mounted together with the casing thereof by means of axis 36 in a ring 37 which in turn is suspended in the pedestal bearings 39 and 40 by means of the axis 38 perpendicular to the axis 36. The gyroscope 35 is further pivotally connected to a stirrup 42 by means of the axis 41 perpendicular to the axis 36, which stirrup 42 is connected to a stirrup 44 by a pin 43. The stirrup 44 is rotatably mounted on the axis 45 carried in the pedestal bearing 46 and 47 and perpendicular to the axis 38. The pedestal bearings 39, 40, 46 and 47 are firmly secured to the airplane. On each axis 38 and 45 is arranged a contact arm 48 and 49 which slides over a resistor 50 and 51 respectively. Each contact arm 48, 49 and each resistor 50, 51 lie, together with each power source 52, 53 in bridge connection with the winding of each rotary magnet 10 and 7.

This arrangement operates as follows:

It is assumed that the arrow shown in the figure indicates the direction of travel of the airplane. Since the gyro casing 35 is always oriented horizontally, every movement of the airplane about its transverse axis will cause a rotation of the gyro casing about the axis 45 as well as a disturbance of the bridge balance through the contact arm 49, which causes a rotation of the rotary magnet 7. Also every movement of the airplane about its longitudinal axis will cause a rotation of the gyro casing about the axis 38 and, therefore, a disturbance of the bridge balance, which causes a rotation of the rotary magnet system 10. These rotations are transmitted to the pointers 9 and 11 which inform the pilot of the magnitude of these rotations.

The measuring instruments 19, 24 and 33 may be arranged at any point of the airplane. It is, of course, also possible to accommodate these instruments in the casing 1 and to cause them to act directly on the pointers; in this manner the rotary magnets may be dispensed with.

The above-described instrument may be employed as a blind flying instrument for a flight with hand control and as a control device for a flight with automatic control.

I claim as my invention:

1. An indicating device for aircraft comprising a gyroscope mounted for motion about the lateral and longitudinal axes of the craft, a pointer carrying an airplane model responsive to the motion of said gyroscope upon pitch of the craft, a second pointer carrying two indicators disposed on opposite sides of said airplane model responsive to the relative motion of said gyroscope upon rolling of the craft about the longitudinal axis thereof, a liquid tube inclinometer vertically disposed with respect to said model and sensitive to pitch and climb of the craft, and a bank indicator disposed generally closely to and at right angles to said inclinometer, said inclinometer liquid level serving as a zero mark for said airplane model and indicators when the craft is in a horizontal position and said tube serving as a zero mark for said bank indicator.

2. In an indicating device for aircraft, a casing, a dial mounted adjacent one end of said casing, there being a vertical slot in said casing, and two concentric arcuate slots disposed on opposite sides of said vertical slot respectively, a pointer carrying an airplane index extending through said vertical slot for up and down motion over said dial, two pointers extending through said arcuate slots respectively for motion in unison over said dial, a gyroscope mounted within said casing for movement about two axes, said airplane index being connected to said gyroscope for actuation thereby upon movement of said gyroscope with respect to one axis and said two pointers being connected to said gyroscope for actuation thereby upon movement of said gyroscope with respect to the other axis, and a liquid tube inclinometer sensitive to pitch and climb of the craft and vertically mounted in juxtaposition to said airplane index and pointers, the liquid level of said inclinometer serving as a zero mark for said index and pointers when the craft is in a horizontal position.

3. In an indicating device for aircraft, a gyro-vertical mounted for freedom about two horizontal mutually-normal axes, a pointer, an index carried by said pointer, means including an electrical circuit and a power source connecting said pointer and gyro-vertical, electrical gradient means controlled by the movement of said gyro-vertical with respect to one axis thereof whereby a current flows in said circuit to position said pointer in accordance with said movement, a second pointer carrying two indicators disposed on opposite sides of said index, means including an electrical circuit and a power source connecting said second pointer and gyro-vertical, electrical gradient means controlled by the movement of said gyro-vertical with respect to the other axis thereof whereby a current flows in said circuit to position said second pointer in accordance with said last movement and a liquid tube inclinometer sensitive to pitch and climb of the craft and vertically disposed generally closely to said index, whereby the liquid level of said inclinometer serves as a zero mark for said index and indicators when the craft is in a horizontal position.

4. In an indicating instrument for aircraft, the combination of a plurality of devices for indicating deviation from a horizontal position as determined by two horizontal mutually-normal axes comprising a gyroscopic device determining said axes and an indicator connected to said gyroscopic device for indicating deviations about one of said axes and a liquid U-tube inclinometer sensitive to pitch and climb of the craft, one leg of said tube being mounted in juxtaposition with said indicator with the level of liquid in said leg coinciding with the position of said indicator during level flight of said craft, said inclinometer tube being disposed longitudinally of the craft so that the liquid level of said leg normally follows the vertical movement of said indicator whereby deviation of said liquid level and indicator from coincidence presents an indication of a trouble condition in one of said devices.

5. An indicating device for aircraft, comprising a gyroscope mounted for motion about the lateral and longitudinal axes of the craft, a pointer carrying an airplane index responsive to the motion of said gyroscope upon pitch of the craft, a second pointer carrying two indicators disposed on opposite sides of said airplane index and responsive to the relative motion of the gyroscope upon rolling of the craft about the longitudinal axis thereof, and a liquid U-tube inclinometer sensitive to pitch and climb of the craft, one leg of said tube being located in proximity to said index and indicators, the liquid level of said inclinometer during horizontal level flight providing a zero mark for said index and indicators.

6. In a device of the character described, a casing, a dial mounted at one end thereof, a rate of turn device, an indicating element operatively connected to said device for movement over said dial, a directional indicator, an indicating element operatively connected to said indicator for movement over said dial in a path adjacent and parallel to the path of said first indicating element, said indicating elements being aligned at zero position and actuated simultaneously upon turn of said craft so as to mutually serve as indices for one another.

7. A device of the character described, comprising means responsive to rate of turn of a craft, a first pointer, means including an electrical circuit and a power source connecting said pointer and said responsive means, electrical gradient means controlled by said responsive means whereby a current flows in said circuit to position said pointer in accordance with the movement of said responsive means, means responsive to change of course of the craft, a second pointer, means including an electrical circuit and a power source connecting said second pointer and said means responsive to change of course, electrical gradient means controlled by said change of course responsive means whereby a current flows in said circuit to position said second pointer in accordance with the movement of said change of course responsive means, said first pointer and said second pointer moving over opposed paths adjacent and parallel to each other upon turn of said craft and aligned with each other upon zero turn whereby one serves as the index of the other.

8. In a device of the character described, a gyroscopic device responsive to rate of turn, an indicating element operatively connected to said device, and a second gyroscopic device responsive to angle of turn, an indicating element operatively connected to said latter device and extending into juxtaposition with said first element, and a liquid column inclinometer positioned to indicate pitch, said inclinometer being disposed to coincide with said first two elements in straight flight of the carrying craft.

9. An aircraft instrument comprising a casing, a dial mounted in said casing near one end thereof, there being a slot in said dial, a liquid inclinometer comprising a tube extending in front of said dial and bisecting said slot, a rate of turn device within said casing, a pointer operatively connected to said device and extending through said slot and projecting in one radial direction to extend over said dial, and a course indicator having a pointer operatively connected thereto, extending through said slot and projecting in the opposite radial direction to extend over said dial, whereby juxtaposed indications of rate of turn and of course are provided measured from said tube as a zero.

10. An aircraft instrument, comprising a rate of turn device, an indicating element operatively connected to said device, a course indicator, an indicating element operatively connected to said indicator and extending into juxtaposition with said first indicating element, a ball type bank indicator sensitive to tilt about the fore and aft horizontal axis of the craft and a liquid column inclinometer sensitive to pitching of the craft, said inclinometer column extending across the paths of movement of said indicating elements and said ball and so disposed as to serve as a zero mark for said rate of turn device, said course indicator and said bank indicator.

PAUL EDUARD KOSTER.